United States Patent [19]

Tatemoto et al.

[11] Patent Number: 4,830,137
[45] Date of Patent: May 16, 1989

[54] MOTOR-DRIVEN TYPE POWER ASSISTED STEERING CONTROL APPARATUS

[75] Inventors: Minoru Tatemoto, Okazaki; Naoki Saito, Maebashi; Mitsuharu Morishita; Shinichi Kohge, both of Himeji, Japan

[73] Assignees: Mitsubishi Denki Kabushiki Kaisha; Nippon Seiko Kabushiki Kaisha, both of Tokyo, Japan

[21] Appl. No.: 136,761

[22] Filed: Dec. 22, 1987

[30] Foreign Application Priority Data

Dec. 26, 1986 [JP] Japan .................................. 61-313212

[51] Int. Cl.⁴ .............................................. B62D 5/04
[52] U.S. Cl. ................................ 180/79.1; 364/424.01
[58] Field of Search ................. 180/79.1, 142; 364/424

[56] References Cited

U.S. PATENT DOCUMENTS

| 3,983,953 | 10/1976 | Bayle | 180/79.1 |
| 4,386,674 | 6/1983 | Sugata | 180/142 |
| 4,716,981 | 1/1988 | Murao | 180/79.1 |
| 4,740,778 | 4/1988 | Harding et al. | 180/79.1 X |

Primary Examiner—John A. Pekar
Attorney, Agent, or Firm—Oblon, Fisher, Spivak, McClelland & Maier

[57] ABSTRACT

Output signals from first and second speed sensors are inputted in a control unit to measure a car speed on the basis of the signals. When the measured value is higher than a predetermined value, control unit determines that one of the speed sensors is abnormal, whereby a motor current to be fed to a d.c. motor is interrupted and a voltage applied to a magnetic clutch is removed.

2 Claims, 4 Drawing Sheets

MOTOR-DRIVEN TYPE POWER ASSISTED STEERING CONTROL APPARATUS

BACKGROUND OF THE INVENTION

The present invention relates to a motor-driven type power assisted steering control apparatus for an automobile in which an auxiliary torque is applied to a steering mechanism by a rotating force from a motor.

A motor-driven type power assisted steering control apparatus of this kind is so constructed that an auxiliary torque is exerted to the steering shaft or the rack of an automobile by means of a transmission device such as a gear or a belt through a gear box by utilizing a driving force given by a motor.

In such control apparatus in which the auxiliary load is removed when a car speed reaches a predetermined level or higher during cruising of the automobile, however, there is a drawback that a steering wheel assumes an unloaded condition when a speed sensor is broken down by a fault such as breaking of a wire.

SUMMARY OF THE INVENTION

It is an object of the present invention to provide a motor-driven type power assisted steering control apparatus which prohibits self-turning of the steering wheel when the speed sensor is broken and which improves reliability during cruising of an automobile without substantial increase of manufacturing cost, by only a slight modification of a control program.

The foregoing and the other objects of the present invention have been attained by providing a motor-driven power assisted steering control apparatus which comprises:

first and second speed sensors for detecting car speed;

a torque sensor disposed on a steering shaft to detect a torque acting on a steering wheel;

a d. c. motor for exerting an auxiliary torque to the steering shaft or a rack;

an electromagnetic clutch which is, on one hand, connected to the output shaft of the d. c. motor and is, on the other hand, connected to the steering shaft or the rack; and a control unit comprising means for receiving first and second electric output signals from said first and second speed sensors and calculating a calculated value of the car speed on the basis of each of said output signals, means for judging whether a difference between the calculated value based on one of said first and second output signals and the calculated value based on the other of said first and second output signals is higher than a reference value; and means for judging that at least one of said speed sensors is abnormal and for deenergizing said electromagnetic clutch and said d.c. motor when said difference is higher than said reference value, whereby the auxiliary torque is removed from said steering shaft.

DETAILED DESCRIPTION OF THE DRAWINGS

In the following, preferred embodiments of the motor-driven type power assisted steering control apparatus of the present invention will be described with reference to the drawings.

Figure 1:
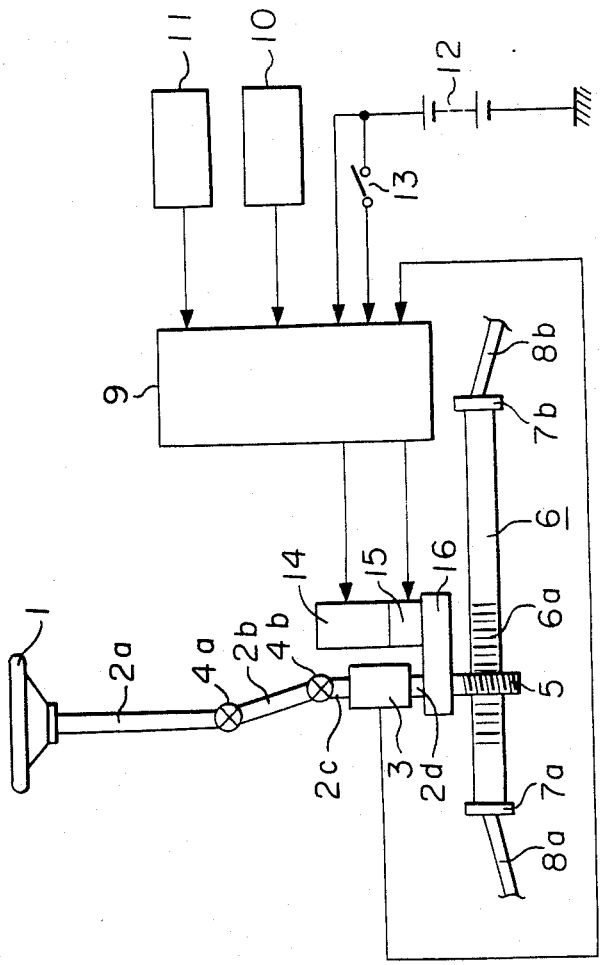
FIG. 1 is a block diagram of an embodiment of the motor-driven type power assisted steering control apparatus according to the present invention.

FIG. 1 is a block diagram showing the construction of an embodiment of the control apparatus. In FIG. 1, a reference numeral 1 designates a steering wheel by which a steering torque is exerted to a steering system. The steering wheel 1 is connected to a first universal joint 4a through a first steering shaft 2a. The first universal joint 4a is connected to a second universal joint 4b through a second steering shaft 2b, and the second universal joint 4b is communicated with a torque sensor 3 through a third steering shaft 2c.

The torque sensor 3 is adapted to output an electric signal in correspondence with a rotating force exerted to the steering wheel so that the output signal is supplied to a control unit 9.

A fourth steering shaft 2d connects the torque sensor 3 with a reduction gear 16 to which a pinion shaft 5 is connected. The pinion shaft 5 is interlocked with the rack teeth 6a of a rack 6. The both ends of the rack 6 are respectively connected to tie rods 8a, 8b through ball joints 7a, 7b.

The negative terminal of a battery 12 is grounded and the positive terminal is, on one hand, directly connected to a control unit 9 and is, on the other hand, connected to the control unit 9 through a key switch 13.

The control unit 9 is adapted to receive output signals from first and second speed sensors 10, 11. The control unit 9 is also adapted to control a d. c. motor 14 having a shunt-wound coil or a shunt magnetic field, and an electromagnetic clutch 15.

The d. c. motor 14 is driven by a power from the battery 12 through the control unit 9, and the electromagnetic clutch 15 functions to make or break a mechanical engagement between the d. c. motor 14 and the reduction gear 16 in accordance with instruction from the control unit 9. The reduction gear 16 is inserted between the electromagnetic clutch 15 and the pinion shaft 5.

Figure 2:
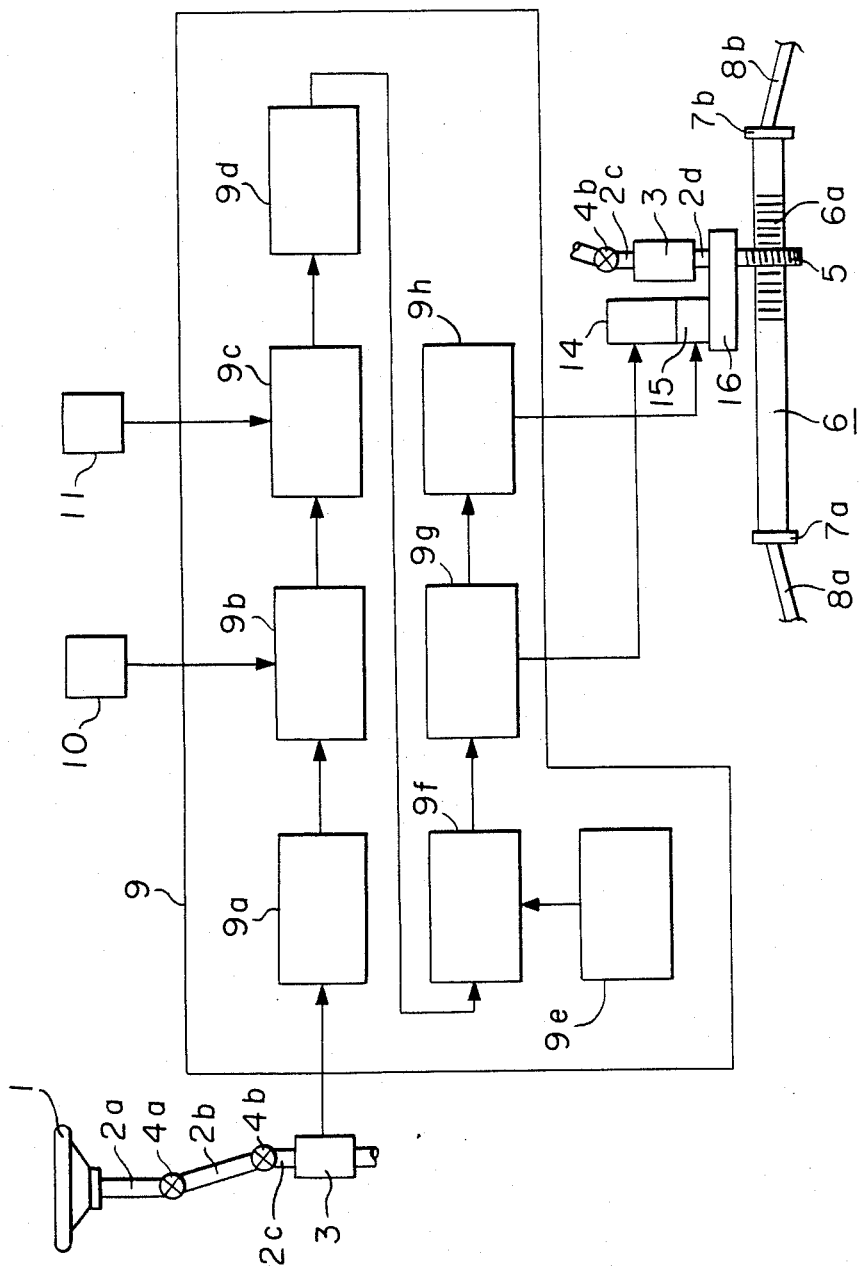
FIG. 2 is a block diagram of an embodiment of a control unit used for the control apparatus of the present invention.

FIG. 2 is a block diagram showing an embodiment of the control unit 9 used for the first embodiment shown in FIG. 1.

In FIG. 2, a reference numeral 9a designates a steering torque measuring means for measuring a steering torque on the basis of an electric output signal from the torque sensor 3. A numeral 9b designates a first car speed measuring means for measuring car speed on the basis of an electric output signal from the first speed sensor 10. A numeral 9c designated a second car speed measuring means for measuring the car speed on the basis of an electric output signal from the second speed sensor 11.

A car-speed-sensor abnormality judging means 9d is adapted to determine abnormality in any of the speed sensors 10 and 11 when an absolute value obtained by subtracting the value measured by the first car speed measuring means 9b from the value by the second car speed measuring means 9c is higher than a predetermined value.

The steering torque measuring means 9a, the first car speed measuring means 9b, the second car speed measuring means 9c, the car-speed-sensor abnormality judging means 9d, a motor current determining means 9f, a motor current control means 9g and an electromagnetic clutch control means 9h are connected in series in this order. The motor current determining means 9f is adapted to receive an electric signal from a motor current memorizing means 9e which stores the data of motor currents flowing in the d. c. motor 14.

The motor current determining means 9f is also adapted to determine a desirable motor current among the data of motor currents which are given on the basis of the steering torque and the car speed, the data being stored in a motor current memorizing means 9e, and renders the motor current to be zero when the output of the car-speed-sensor abnormality judging means 9d indicates an abnormal state in any of the speed sensors 10, 11.

The motor current control means 9g controls a current flowing in the d. c. motor 14 on the basis of an output from the motor current determining means 9f. The electromagnetic clutch control means 9h controls the operation of the electromagnetic clutch 15 in such a manner that engagement and disengagement of the clutch 15 is controlled depending on both of a condition given by at least the car speed and a condition of the output of the car-speed-sensor abnormality judging means 9d.

Figure 3:
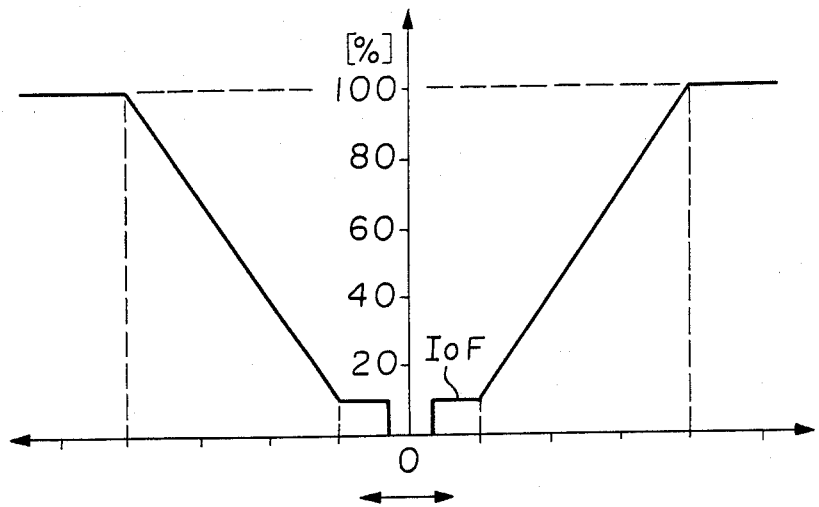
FIG. 3 is a characteristic diagram showing a relation of a torque of steering to a motor current to illustrate the operation of the above-mentioned embodiment.
Figure 4:
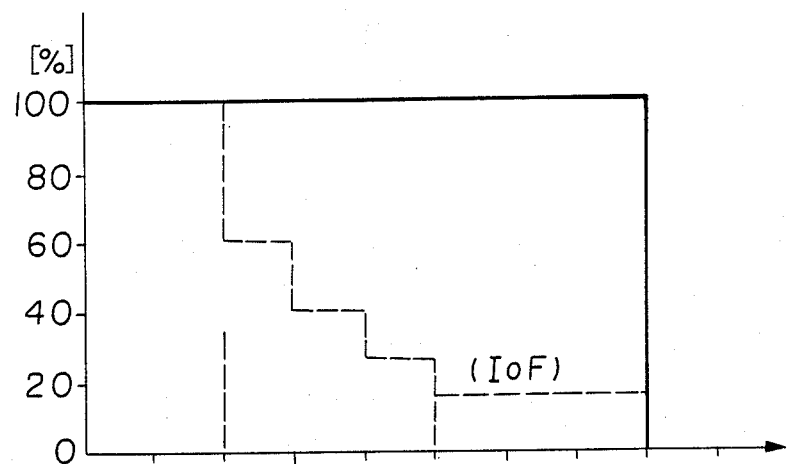
FIG. 4 is a characteristic diagram showing a relation of car speed to the motor current and a voltage applied to an electromagnetic clutch to illustrate the operation of the above-mentioned embodiment.

The operation of the above-mentioned embodiment will be described with reference to FIGS. 3 to 5. FIG. 3 is a characteristic diagram showing control of a motor current to a steering torque; FIG. 4 is a characteristic diagram showing control of a motor current and a voltage applied to the electromagnetic clutch to car speed; and FIG. 5 is a flow chart showing a control program for the control unit 9.

Figure 5:
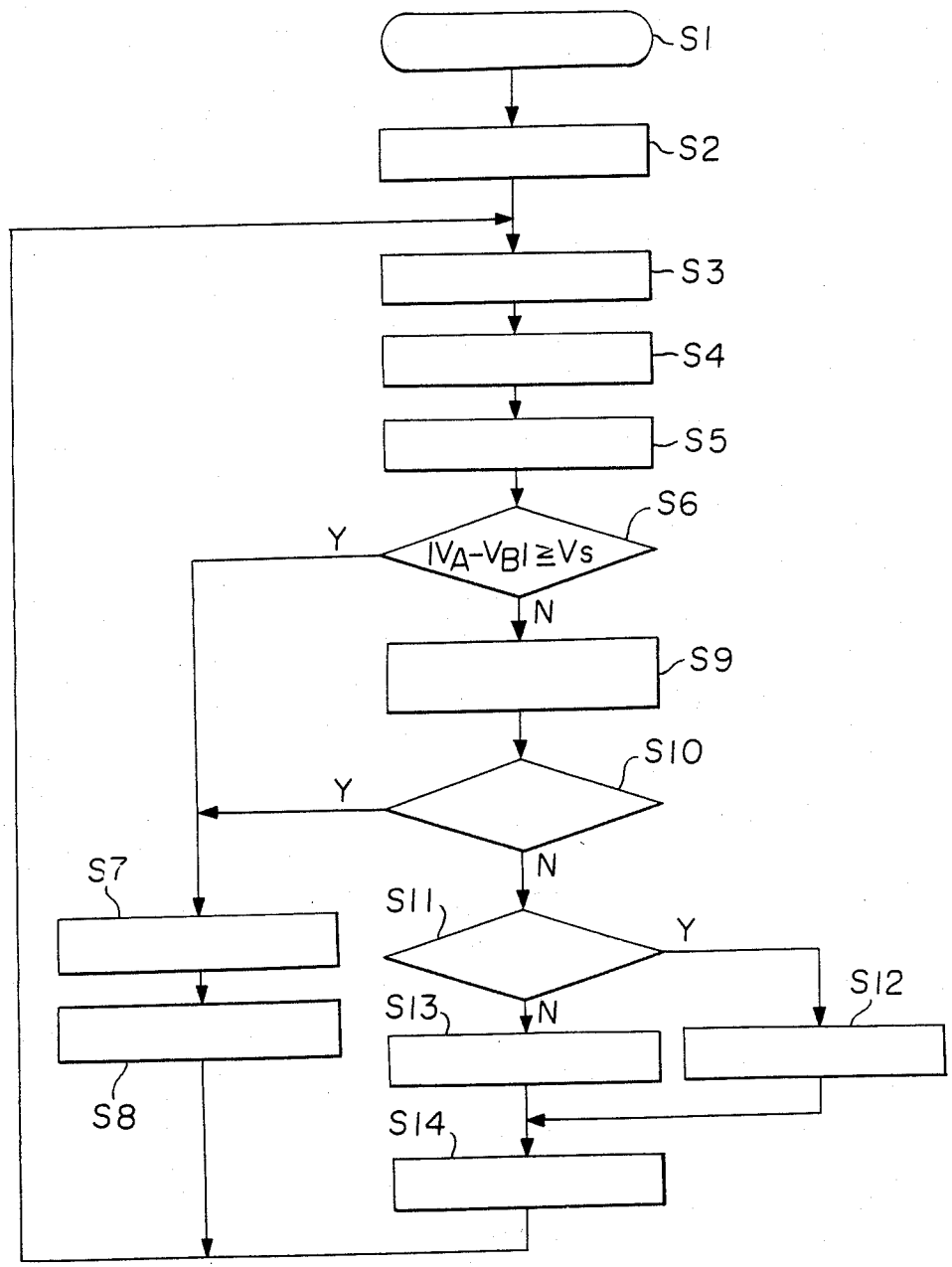
FIG. 5 is a flow chart on a control program for the above-mentioned embodiment.

In FIG. 5, when the key switch 13 is turned on to start the engine at Step S1, a condition for operation is ready. Namely, the electromagnetic clutch 15 is actuated so that the d. c. motor 14 is mechanically connected to the reduction gear 16.

The operation of the control apparatus of the present invention under the condition that the automobile is parking and the d. c. motor 14 is connected to the reduction gear 16 will be described. When a rotating force is given to the steering wheel 1 by a driver, a current flowing in the d. c. motor 14 is controlled by the control unit 9 as shown in FIG. 3.

When the steering torque is increased on the right hand in FIG. 3, the d. c. motor 14 is turned on at a point a so that a current $I_{OF}$ (such as about 2 amperes–10 amperes) flows in the motor 14 in order to reduce influence of inertia of the d. c. motor 14 and the mechanical system of the apparatus.

When the torque of steering is further increased, the current flowing in the motor is also linearly increased from a point b, and finally, the motor current becomes a 100% current at a point c. On the other hand, when the torque is decreased, the motor current is decreased from the point c, and it assumes the current $I_{OF}$ at the point b. When the torque is further decreased to the point a, the d. c. motor 14 is turned off. The operation as described above is applicable when the torque is also exerted on the left hand in FIG. 3.

The steering torque is in proportion to the motor current. Accordingly, when the torque is increased in FIG. 3, the d. c. motor 14 is on at the point a to feed the motor current $I_{OF}$. Since the current in the d. c. motor is gradually increased as the torque is increased, the output of the d. c. motor to the reduction gear 16 is also gradually increased, i.e. a torque to the reduction gear 16 is gradually increased. As a result, an auxiliary torque which is in correspondence to a force applied to the steering wheel 1 by the driver is transmitted to the rack teeth 6a through the electromagnetic clutch 15, the reduction gear 16 and the pinion shaft 5; thus, the operation of turning the steering wheel 1 is smoothly carried out.

In the following, the operation of the control apparatus when the automobile runs will be described. During cruising of the automobile, control of the motor current is conducted as shown in FIG. 4, in which a current $I_{M1}$ is fed to the motor 14. The current value corresponding to $I_{M1}$ is stored in a motor current memorizing means 9e on the basis of the data on the steering torque and the car speed.

A way to control the motor current will be described with reference to FIG. 5.

At step 3, the first car speed measuring means 9b receives a first output signal from the first speed sensor 10 to measure a car speed VA. On the other hand, at Step 4, the second car speed measuring means 9c receives a second output signal from the second speed sensor 11 to measure a car speed VB. Then, the steering torque measuring means 9a measures a torque of steering TS on the basis of an output signal from the torque sensor 3 at Step 5. Then, at Step S6, judgement is made as to whether or not $|VA-VB| \geq VS$ (VS is a reference value for judging abnormality in any of the speed sensors) at the car-speed-sensor abnormality judging means 9d. If $|VA-VB| \geq VS$ is not established, the motor current determining means 9f determines non-abnormality and takes the value of motor current $I_{M1}$ from the motor current memorizing means 9e at Step S9. The motor current $I_{M1}$ assumes a value depending only on the torque of steering until reaching the point d.

When the car speed exceeds the point d, the motor current takes a value obtained by multiplying a reduction factor (which is determined depending on the car speed V) by a value corresponding to the steering torque. If the conditions of VA>V1 and VA>V2 are not established at Step 10 and Step 11 respectively, then sequential operation goes to Step 13 where the motor current $I_{M1}$ is changed to $I_M$, and thereafter, goes to Step 14 where the electromagnetic clutch 15 is engaged with the reduction gear 16. When the car speed exceeds a point 3 (the car speed is a speed V2 which reduces assistance, i.e. necessity of the auxiliary torque), comparison of the car speed is made as to whether or not VA>V1 (V1: a car speed for terminating the assistance) at Step S10. If it is not the case, comparison of the car speed is made as to whether or not VA>V2 (V2: a car speed for reducing the assistance) at Step S11. If VA>V2, the value of motor current is made constant (i.e. the current $I_{OF}$) by the motor current control means 9g at Step S12.

At Step S10, when the car speed reaches the point f (car speed: V1), the motor current determining means 9f determines the motor current to be fed into the d. c. motor 14 at Step S7; namely, the motor current to the d.

c. motor 14 is rendered to be zero by the motor current control means 9g. Then, the electromagnetic clutch control means 9h makes a voltage to be applied to the electromagnetic clutch 15 zero at Step S8.

Thus, the motor current and the voltage to the electromagnetic clutch become zero so that the d. c. motor 14 is mechanically separated from the reduction gear 16. As a result, the driver can operate the steering wheel 1 without any assistance of the auxiliary torque given by the d. c. motor. When the relation of $VA > V2$ is established at Step S11, the motor current $I_{OF}$ is changed to a value $I_M$ at Step S12, after which the electromagnetic clutch 15 is actuated at Step 14.

As described above, in the conventional apparatus, when a speed sensor is broken due to, for instance, breaking of a wire, an auxiliary torque is applied to the steering shaft during high speed cruising because control of steering shaft depending on car speed is not carried out. This causes danger in driving the automobile owing to that handling operation of the steering wheel is too light.

In the present invention, however, the speed sensor 11 is installed in addition to the first speed sensor 10. Accordingly, signals from the first and second speed sensors 10, 11 are input in the control unit 9 to obtain difference in an absolute value between the car speeds which are respectively measured by the speed sensors 10, 11. When the difference is higher than a predetermined value (such as 5 km/H or higher), then judgement is made that the car speed sensing device is abnormal.

When the judgement of abnormality on the car speed sensing device is provided, the control unit controls the motor current to the d. c. motor 14 and the voltage applied to the electromagnetic clutch 15 to be zero so that any auxiliary load is not applied to the steering shaft.

As described above, in the present invention, two speed sensors are provided to feed each electric output signal to the control unit so that car speed is calculated based on the signals. A control program for the control unit is modified in such a manner that when a difference in value as a result of the calculation is higher than a predetermined value, a car speed sensing device is considered to be abnormal, whereby a motor current to be fed to a d. c. motor is interrupted and application of a voltage to an electromagnetic clutch is stopped. Accordingly, a drawback that handling operation for a steering wheel is too light at the time of the breaking down of the speed sensor as seen in the conventional apparatus can be eliminated by providing an additional speed sensor and a slight modification of the control program. The present invention increases reliability of an automobile without pushing up a manufacturing cost.

We claim:

1. A motor-driven power assisted steering control apparatus which comprises:
    first and second speed sensors for detecting car speed;
    a torque sensor disposed on a steering shaft to detect a torque acting on a steering wheel;
    a d.c. motor for exerting an auxiliary torque to said steering shaft or a rack;
    an electromagnetic clutch which is connected to the output shaft of said d.c. motor and to said steering shaft or said rack; and
    a control unit comprising means for receiving first and second electric output signals from said first and second speed sensors and calculating a calculated value of the car speed on the basis of each of said output signals; means for judging whether a difference between the calculated value based on one of said first and second output signals and the calculated value based on the other of said first and second output signals is higher than a reference value; and means for judging that at least one of said speed sensors is abnormal and for deenergizing said electromagnetic clutch and said d.c. motor when said difference is higher than said reference value, whereby the auxiliary torque is removed from said steering shaft.

2. The motor-driven type power assisted steering control apparatus according to claim 1, wherein said control unit further comprises:
    a steering torque measuring means for receiving an electric signal from said torque sensor to measure a steering torque;
    a motor current memorizing means for storing data of values concerning steering torque and motor current corresponding to car speed;
    a motor current determining means which determines a desirable motor current among the data of the motor current which is determined by the steering torque and the car speed, the data being stored in said motor current memorizing means and which renders the motor current to be zero when the output of said judging means judges that said difference is higher than said reference value and that at least one of said speed sensors is abnormal;
    a motor current control means for controlling said motor current on the basis of an output from said motor current determining means; and
    an electromagnetic clutch control means to control engagement and disengagement of said electromagnetic clutch depending on both of a condition of the output of said judging means and a condition determined by at least the car speed.

* * * * *